United States Patent [19]

Yamaguchi

[11] Patent Number: 4,574,418
[45] Date of Patent: Mar. 11, 1986

[54] DISK CLEANING MAT

[75] Inventor: Izumi Yamaguchi, Ohmiya, Japan

[73] Assignee: Kabushiki Kaisha Nagaoka, Tokyo, Japan

[21] Appl. No.: 692,626

[22] Filed: Jan. 18, 1985

[30] Foreign Application Priority Data

Oct. 15, 1984 [JP]  Japan .................................. 59-215648

[51] Int. Cl.⁴ ............................................... G11B 3/58
[52] U.S. Cl. ........................................ 15/268; 369/72
[58] Field of Search ...................... 15/268; 369/72, 73, 369/264; 206/309; 118/500; 269/289 R

[56]  References Cited

U.S. PATENT DOCUMENTS

| 4,194,464 | 3/1980 | Dye et al. | 15/268 X |
| 4,486,916 | 12/1984 | Allsop | 369/72 |
| 4,520,470 | 5/1985 | d'Arc | 369/72 |

Primary Examiner—Edward L. Roberts
Attorney, Agent, or Firm—James E. Nilles

[57]  ABSTRACT

A disk cleaning mat wherein in the surface of a mat body first, second and third annular recesses for holding an LP disk, EP disk and a compact disk, respectively, are provided, and grounding portions electrically connected to the reverse side of the mat body are mounted on the respective recesses. The first and second recesses are concentric with each other, while the third recess is centered at a point offset from the common center of the first and second recesses.

6 Claims, 7 Drawing Figures

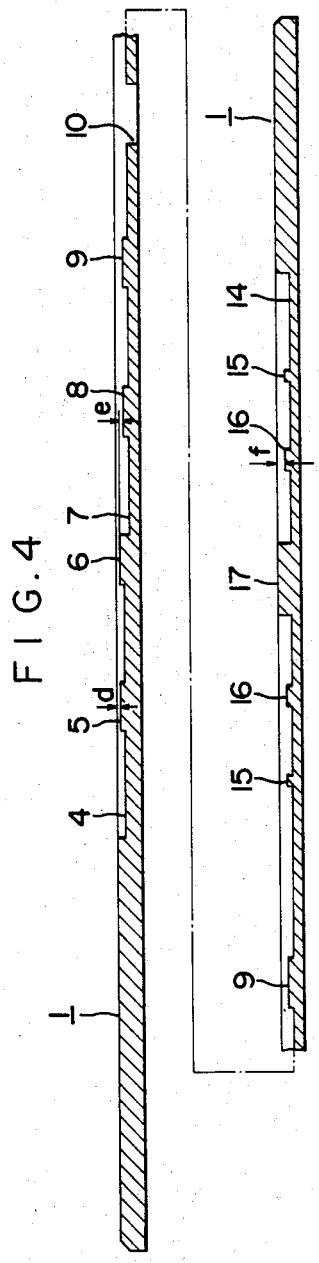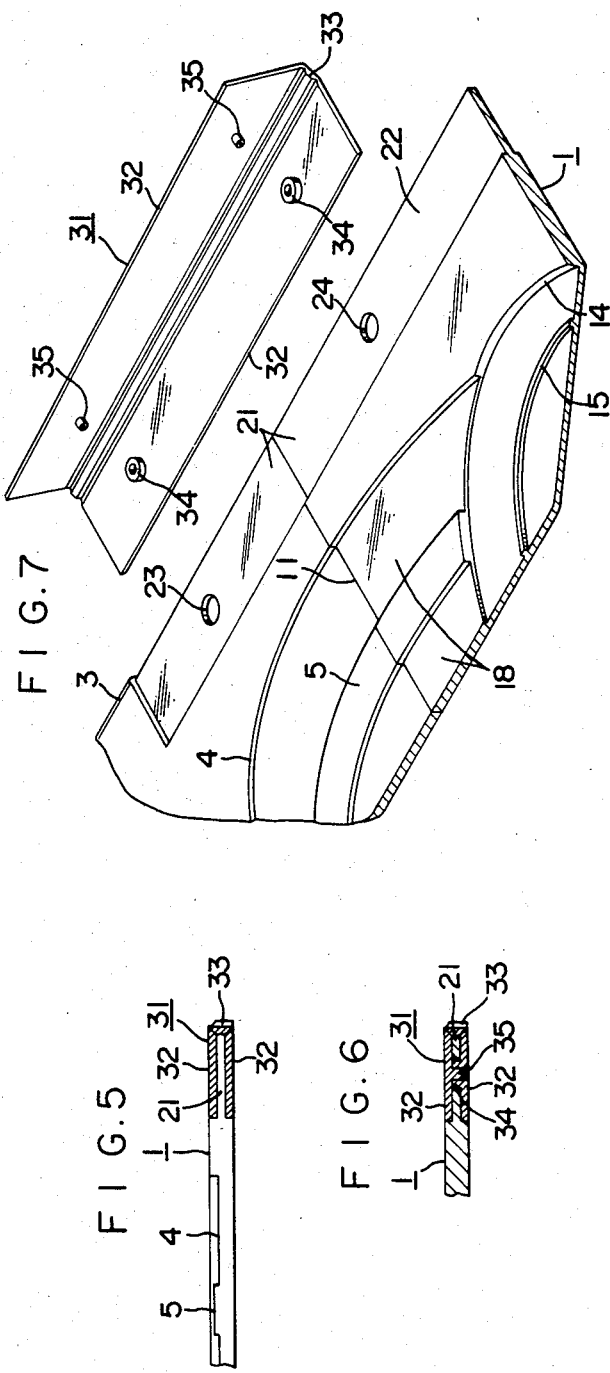

DISK CLEANING MAT

BACKGROUND OF THE INVENTION

1. Field of the Invention:

The present invention relates to a disk cleaning mat and, more particularly, to a disk cleaning mat on which disk such as an LP disk, laser disk, EP disk and compact disk is placed when the disk is cleaned.

2. Description of the Prior Art:

Cleaning of analog type audio disk is usually conducted by a cleaner held in one hand while the disk is held on the other hand or while the disk is placed on the turn table of a player.

The cleaning while holding the disk on hand is rather difficult because the disk is not easy to hold, particularly in the case where the disk is 30 cm LP disk. In addition, since the disk held by hand is "floated", it is not allowed to press the cleaner sufficiently strongly onto the disk surface.

In contrast, the cleaning while placing the disk on the turn table is rather easy to conduct and the disk can be pressed by a large force during the cleaning so that the disk can be cleaned sufficiently.

From this point of view, it is desirable that the disk cleaning is done while placing the disk on the turn table.

Some of modern disk players incorporate a turn table system of the type called "front loading type". The rigidity of this turn table is large enough to support the disk during the playing back but is insufficient to withstand the pressure applied during the cleaning.

In ordinary disk player having a conventional turn table placed on the player unit, it is a current trend to limit the opening angle of the dust cover which covers the turn table. In such a case, the cleaning of the disk is hindered by the dust cover.

Laser disk players and compact disk players which are spreading recently are not constructed to allow the disk cleaning with the disks placed on the players. The cleaning of a laser disk or a compact disk, therefore, should be done while holding the disk in hand. This cleaning work is rather difficult to conduct and does not sufficiently clean the disk.

In the case of a disk made of vinyl chloride, the disk is electrostatically charged when rubbed by a cleaner. This electrostatic charge produces noises during the play back and attracts dust and other contaminants towards the disk surface.

SUMMARY OF THE INVENTION

Accordingly, an object of the invention is to provide a disk cleaning mat capable of carrying various disks to facilitate the cleaning of the disks and to ensure a sufficient cleaning effect, while allowing electrostatic charge produced during the cleaning to escape from the disk surface.

To this end, according to the invention, there is provided a disk cleaning mat comprising: a mat body provided in the surface thereof with first, second and third annular recesses corresponding in size to an LP disk, EP disk and a compact disk, respectively, and grounding portions provided in respective recesses and electrically connected to the reverse side of the mat body.

An LP disk, laser disk, EP disk or a compact disk is placed on one of the first to third recesses during the cleaning and the electrostatic charge produced during the cleaning is allowed to escape through the grounding connection.

Other objects, features and advantages of the invention will become clear from the following description of the embodiment when the same is read in conjunction with the accompanying drawings.

BRIEF DESCRIPTION OF THE DRAWINGS

FIG. 4 is a sectional view taken along the line IV—IV of FIG. 1;

FIGS. 5 and 6 are vertical sectional views illustrating a holder holding a clamp section; and FIG. 7 is an exploded perspective view of the holder and the clamp section.

DESCRIPTION OF THE PREFERRED EMBODIMENT

Figure 1:
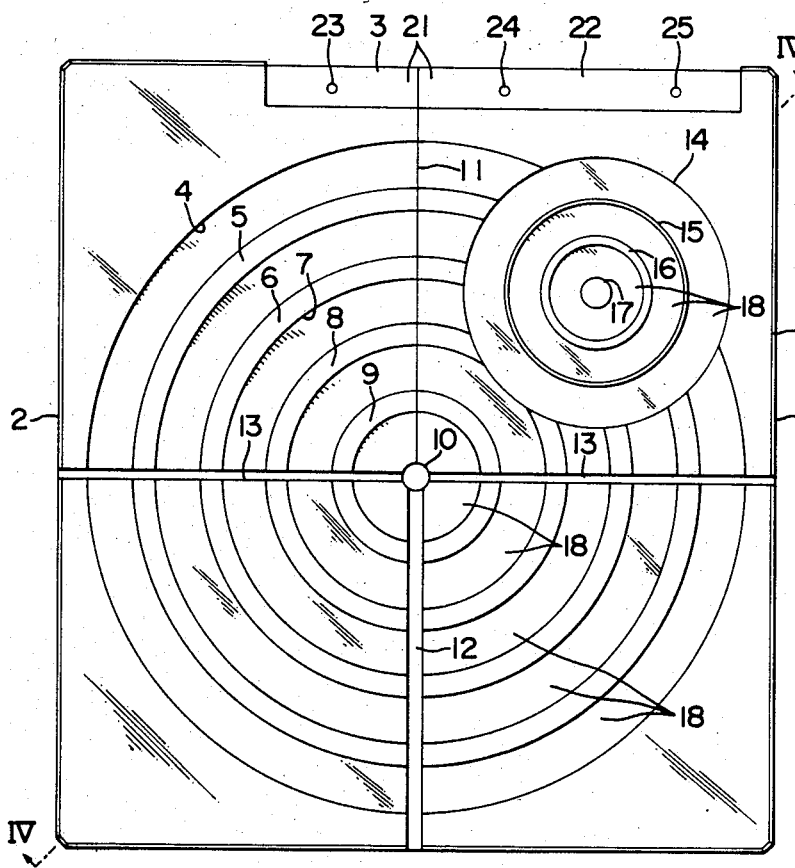
FIG. 1 is a plan view of an embodiment of the cleaning mat in accordance with the invention.
Figure 3:
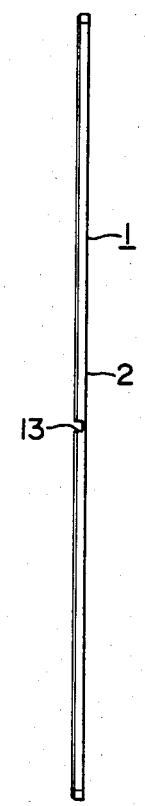
FIG. 3 is a side elevational view of the cleaning mat.
Figure 2:
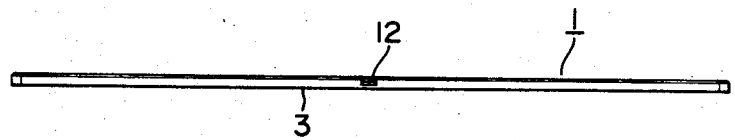
FIG. 2 is a front elevational view of the cleaning mat shown in FIG. 1.

Referring to the drawings, disk cleaning mat embodying the present invention has a planar mat body 1 having a rectangular form and made of a soft foamed plastic material such as foamed polyurethane, foamed polyethylene and foamed polyvinyl chloride. The shape of the mat, although expressed as being "rectangular", is almost square because the sizes of the longer and shorter sides thereof are about 34.5 cm and about 32.5 cm, respectively.

A first circular recess 4 is formed in the upper surface of the mat body 1. This recess 4 has a diameter of about 30 cm which corresponds to the diameters (30 cm) of analog-type LP disk (referred to simply as "LP", hereinunder) or optical laser disk (referred to simply as "LD").

An annular ridge 5 of a diameter smaller than that of the first recess 4 and a second annular ridge 6 of a diameter smaller than that of the first annular ridge 5 are formed on the surface of the mat body 1 within the first recess 4 concentrically therewith. The first and the second annular ridges 5 and 6 have an equal axial height which is smaller than the height of the periphery defining the first recess 4 by a size d equal to the thickness of the LP or the LD.

The second annular ridge 6 has an inside diameter of about 17 cm which corresponds to the diameter (17 cm) of the analog-type EP disk (referred to simply as "EP"). This annular ridge 6 defines a circular second recess 7 concentric with the first recess 4. The depth of the second recess 7 as measured from the periphery of the first recess 4 is greater than the depth of the first recess 4.

Furthermore, a third annular ridge 8 of a diameter smaller than that of the second recess 7 and a fourth annular ridge 9 of a diameter smaller than the third annular ridge 8 are formed on the surface of the mat body 1 within the second recess 7 concentrically therewith. The third and the fourth annular ridges 8 and 9 have an equal height which is smaller than that of the second annular ridge 6 by a size e which substantially equals to the thickness of the EP.

The mat body 1 is provided with a central bore 10 at which the first and second recesses 4 and 7, as well as the first to fourth annular ridges 5, 6, 8 and 9 are centered.

The central bore 10 is located on a line which connects the centers of both shorter sides 3, 3 of the mat body 1 and is slightly offset towards one shorter side 3 from the mid point of this line. That is, the first and the second recesses 4 and 7, as well as the first to the fourth annular ridges 5, 6, 8 and 9 as a whole are deviated towards one side 3 of the mat body 1 from the geometrical cetner of the latter so that a margin of a predetermined width is left on the other side 3.

A slit 11 is formed to extend from the center of the side 3 where the margin is provided to the central bore 10, while a first folding line 12 in the form of a groove is formed on the extension of this slit 11 so as to extend from the central bore 10 to the center of the other side 3.

The mat body 1 further has a second folding line 13 in the form of a groove which extends between one 2 to the other 2 of the longer sides of the mat body 1, past the central bore 10 and intersecting the slit 11 and the first folding line 12 at a right angle.

A third annular recess 14 having a diameter of about 12 cm corresponding to the diameter (12 cm) of a compact disk (referred to simply as "CD") is formed in one of the quarters defined by the slit 11 and the second folding line 13. A fifth annular ridge 15 of a diameter smaller than the recess 14 and a sixth annular ridge 16 having a diameter smaller than that of the fifth annular ridge 15 are formed within the area of the third recess 14 concentrically therewith. A cylindrical projection 17 projects from the center of the third recess 14 so as to fit in the central bore of the CD.

The fifth and the sixth annular ridges 15 and 16 have an equal height which is smaller than the height of the periphery of the third recess 14 by a size f which substantially equals the thickness of the CD. The cylindrical projection 17 has the same height as the periphery of the third recess 14.

The grounding portions 18 constituted by, for example, carbon fibers are formed on the rear side of the mat body 1, as well as in the bottom surfaces of the first to third recesses 4, 7 and 14. The grounding portion 18 in the bottom of the first to third recesses 4, 7 and 14 is electrically connected to the grounding portion 18 on the rear side of the mat body 1 through the slit 11 or by means of a suitable conductor penetrating the mat body 1 in the thicknesswise direction. The grounding portions 18 may be constituted by a coating of a conductive material continuously covering the obverse and reverse sides of the mat body 1.

A clamp section 21 extending over the slit 11 and a holder rest 22 connected to the clamp section 21 are provided in the margin so as to extend along the side 3 having the margin mentioned before. The clamp section 21 and the holder rest 22 have a thickness smaller than that of the mat body 1. The clamp section 21 has engaging holes 23, 24 formed at both sides of the slit 11, while the holder rest 22 has a third engaging hole 25 which is spaced from the second engaging hole 24 by a distance equal to that between the first and the second engaging holes 23 and 24.

A reference numeral 31 designates a holder made of a plastic and constituted by a pair of flaps 32 and 32 connected to each other through a thin-walled hinge 33. A pair of engaging cylinders 34, 34 are formed on the surface of one of the flaps 32, 32. The distance between these engaging cylinders 34, 34 is equal to the distance between the first and the second engaging holes 23, 24. The other flap 32 has a pair of engaging bosses 35, 35 which are spaced by the same distance as that between the first and second engaging holes 23, 24. The arrangement is such that, when the flaps 32, 32 are turned one on the other about the axis of the thin-walled hinge 33, the engaging bosses 35, 35 are received in the engaging cylinders 34, 34.

This cleaning mat is used in a manner explained hereinunder.

Before cleaning an LP, LD, EP or CD using this cleaning mat, the holder 31 fits on the clamp section 21 across the slit 11 so that the sections on both sides of the slit 11 may not swing relatively to each other. To this end, the flaps 32, 32 of the holder 31 are swung away from each other about the thin-walled hinge 33 and, after placing the engaging cylinders 34, 34 on one of the flap 32 in the engaging holes 23, 24 in the clamp section 21, the other flap 32 is swung towards the clamp section 21 until the engaging bosses 35, 35 come into corresponding engaging cylinders 34, 34. In this state, the clamp section 21 is clamped and held by the pair of flaps 32,32.

For cleaning a disk, e.g., an LP, the LP is placed in the first recess 4 and a cleaner is moved circumferentially along the recording grooves in the disk thereby cleaning the disk. When the cleaner is moved, a horizontal force is applied to the LP tending to cause the disk to slide on the cleaning mat body 1. However, the LP is prevented from coming off from the cleaning mat body 1 because the peripheral edge of the disk is held by the peripheral edge of the first recess 4.

Other disks such as LD, EP and CD can be cleaned substantially in the same manner, although different recesses are used. Namely, the LP, EP and the CD are placed, when cleaned, in the first, second and third recesses 4, 7 and 14, respectively. The cleaning of the LD and CD should be effected by moving the cleaner not circumferentially but radially outwardly from the disk center, for the reason explained hereinunder. Namely, in the LD and CD, pulse codes of [0] and [1] are formed spirally in the circumferential direction at a high density. These codes are read by a laser reading unit which has a function for correcting any reading error due to lack of a signal judging from the signals at both sides of the lacked signal. Therefore, if the disk surface is cleaned by the cleaner moved circumferentially, the disk may be scratched or damaged in the circumferential direction which coincides with the direction of recording. Such a scratch or damage would cause a long disturbance of signal due to random reflection from the disk surface, making it impossible to correct the error through judgement from the signals obtained before and after the lacked signal.

It is often experienced that the electrostatic charge produced on the disk during the cleaning attracts dusts and other foreign matters. In the case of the analog type record disk, such dusts and foreign matters tend to cause noises during the playback through a stylus.

According to the invention, this problem is avoided because the electrostatic charge produced on the disk is discharged to the ground through the grounding portions 18 formed in the bottom surface of the first to third recesses 4, 7 and 14.

The disks placed in the first to third recesses 4, 7 and 14 are supported by the first to sixth annular ridges 5, 6, 8, 9, 15 and 16 so that certain gaps are formed between the lower faces of the disks and the bottoms of the recesses 4, 7 and 14. However, the electrostatic charge is discharged jumping over this space.

Consequently, the attaching of dusts and other foreign matters due to the electrostatic attracting force is avoided so that generation of noises, often experienced in CD and LD due to interruption of the laser beam by the dusts, is avoided advantageously. Problems in LP and EP such as the generation of noise due to attaching of dusts to the playback stylus or due to the electrostatic charge itself are also avoided.

When the cleaning is finished, the holder 31 is detached from the cleaning mat body 1 and is placed on the holder rest 22 with the pair of engaging cylinders 34, 34 received in the second and third engaging holes 24 and 25, respectively.

Then, the cleaning mat body 1 is first folded inwardly along the first folding line 12 and then outwardly along the second folding line 13 so that the area of the cleaning mat body 1 is reduced to ¼ for an easy accommodation.

In the described embodiment, the first and second recesses 4 and 7 are formed concentrically with each other, while the third recess 14 is positioned with an offset from the center of the first and second recesses 4 and 7. This, however, is not exclusive and the third recess 14 may be formed concentrically with the first and the second recesses 4 and 7. When the third recess 14 for receiving a CD is provided separately from the recesses for other types of disks as in the illustrated embodiment, the user will be easily aware of the fact that CD requires a specific way of cleaning different from that for other types of disk, thus avoiding incorrect cleaning of CD.

The holder rest 22 need not always be formed integrally with the clamp section 21 but may be formed on other peripheral portion of the cleaning mat body 1. However, the provision of the holder rest continuing from the clamp section 21 as in the illustrated embodiment offers an advantage that one 24 of two engaging holes 23, 24 for securing the holder 31 to the clamp section 21 can be used as one of the holes 24, 25 for securing the holder 31 on the holder rest 22, so that the production of the disk cleaning mat is facilitated considerably.

Preferably, the mat body 1 is roughened at its back surface so that it may not slide during the cleaning.

As has been described, the invention provides a disk cleaning mat having a mat body provided in the surface thereof with first, second and third recesses corresponding in size to an LP disk, EP disk and compact disk, respectively. During the cleaning of these disks, the disks are stably held in the corresponding recesses so that the cleaning can be conducted more easily as compared with the case where the disk is held on the user's hand during the cleaning.

These recesses effectively holds the disks against horizontal force applied during the cleaning, so that the disks are prevented from coming off from the cleaning mat body.

Furthermore, electrostatic charge produced on the disk during the cleaning is allowed to escape through the grounding portions formed on the cleaning mat body. This effectively prevents various problems such as re-attaching of dust and other foreign matters on the disk surface due to electrostatic attracting force, and generation of noise due to the electrostatic charge during playback of analog-type disk such as LP disks and EP disks.

What is claimed is:

1. A disk cleaning mat comprising: a mat body provided in the surface thereof with first, second and third annular recesses corresponding in size to an LP disk, EP disk and a compact disk, respectively, and grounding portions provided in respective recesses and electrically connected to the reverse side of said mat body.

2. A disk cleaning mat according to claim 1, wherein said first and second recesses are concentric with each other, while said third recess is centered at a point offset from the common center of said first and second recesses.

3. A disk cleaning mat according to claim 1 or 2, wherein said mat body is provided with a slit for allowing the folding of said mat body.

4. A disk cleaning mat according to claim 1 or 2, wherein said mat body is provided in at least a part thereof with a folding line in the form of a groove which permits folding of said mat body.

5. A disk cleaning mat according to claim 3, further comprising a detachable holder adapted to clamp the outer peripheral edge of said mat body across said slit.

6. A disk cleaning mat according to claim 5, further comprising a holder rest provided on the outer peipheral edge of said mat body on which said holder resets when it is not used.

* * * * *